United States Patent [19]

Linville

[11] Patent Number: 4,945,848
[45] Date of Patent: Aug. 7, 1990

[54] REINFORCED SAILCLOTH

[76] Inventor: James C. Linville, 16 S. Beach Dr., Rowayton, Conn. 06853

[21] Appl. No.: 258,868

[22] Filed: Oct. 17, 1988

[51] Int. Cl.⁵ .............................................. B63H 9/06
[52] U.S. Cl. .................................... 114/103; 428/110; 428/246
[58] Field of Search ...................... 114/102, 103, 39.1; 428/284, 294, 297, 298, 105, 104, 110, 253, 247, 111, 910, 114; 156/177, 178, 179, 436, 440

[56] References Cited

U.S. PATENT DOCUMENTS

| | | | |
|---|---|---|---|
| 3,954,076 | 5/1976 | Fracker | 114/103 |
| 4,444,822 | 4/1984 | Doyle et al. | 428/109 |
| 4,593,639 | 6/1986 | Conrad | 114/103 |
| 4,624,205 | 11/1986 | Conrad | 114/103 |
| 4,679,519 | 7/1987 | Linville | 114/103 |
| 4,702,190 | 10/1987 | Conrad | 114/103 |
| 4,708,080 | 11/1987 | Conrad | 114/103 |

Primary Examiner—Joseph F. Peters, Jr.
Assistant Examiner—Jesus D. Sotelo
Attorney, Agent, or Firm—St. Onge Steward Johnston & Reens

[57] ABSTRACT

A composite sail (mainsail, jib, spinmaker) is provided which is fabricated from a series of panels each of which is joined to an adjacent panel. The individual panels comprise laminates of two outer layers between which is an inner layer comprising a weft-free warp of strands of a stretch resistant polymer aligned substantially in the direction of the longitudinal dimension of the panel. One of the outer layers can itself be a laminate of at least two layers of material between which is disposed a non-woven, force-bearing thread material aligned along the principal stress lines experienced by the panel when incorporated in the sail. In a particular embodiment one outer layer is comprised of a plurality of individual segments joined together along abutting edges, each of the segments being formed from a reinforced sheet having a layer of weft-free warp of strands of a stretch resistant polymer. The individual segments in the panel may have differing strand denier density the segments in the leech of the sail having greater such density than those in the luff.

20 Claims, 4 Drawing Sheets

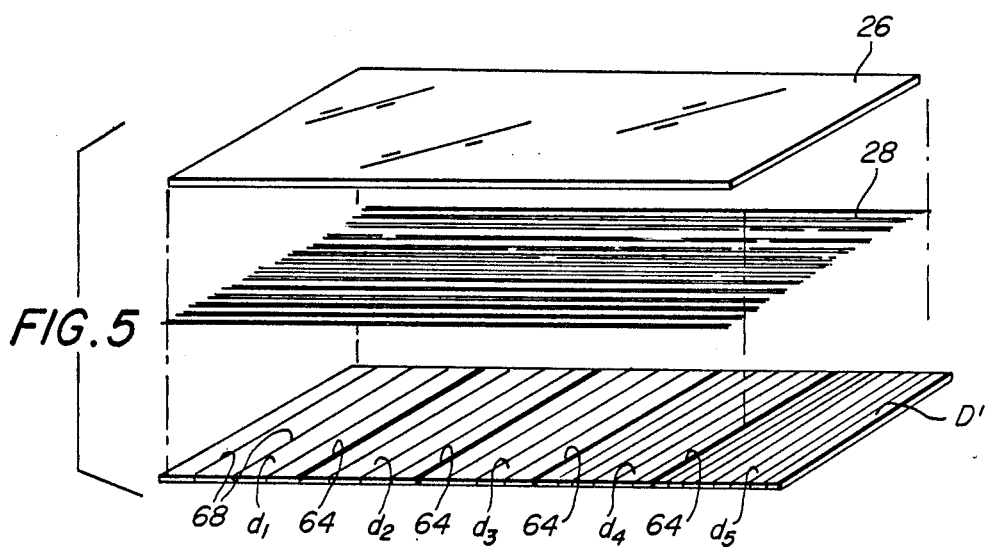
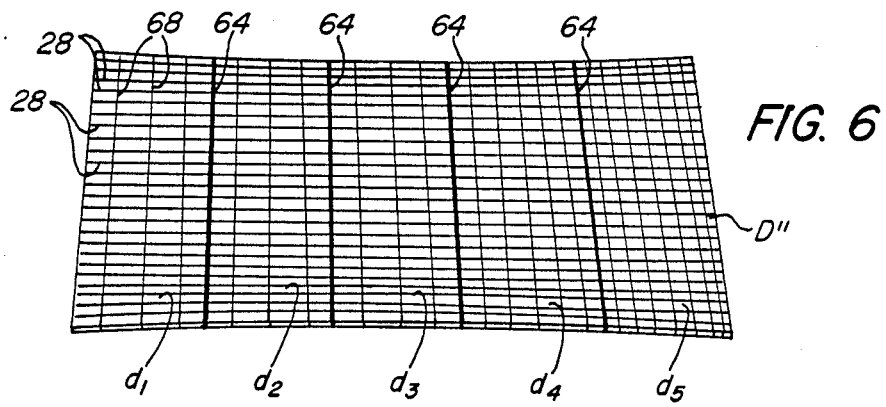
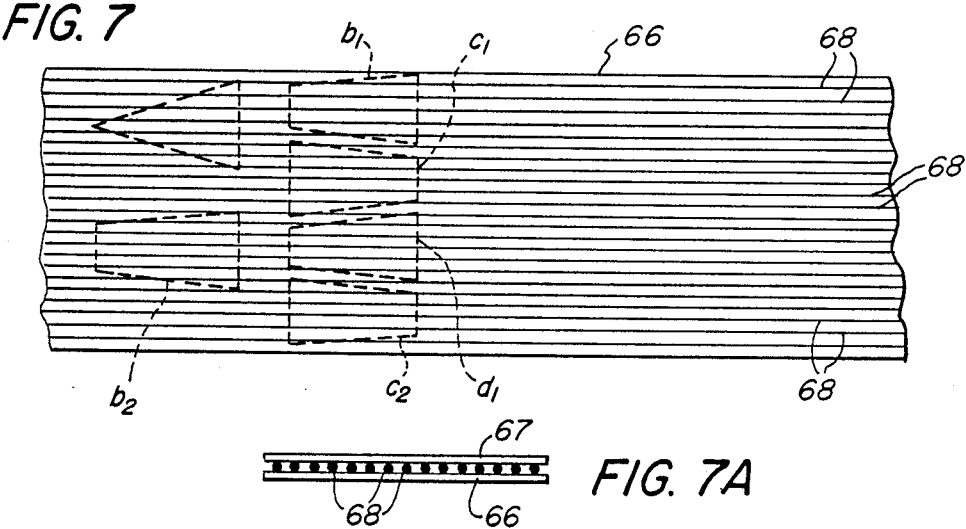

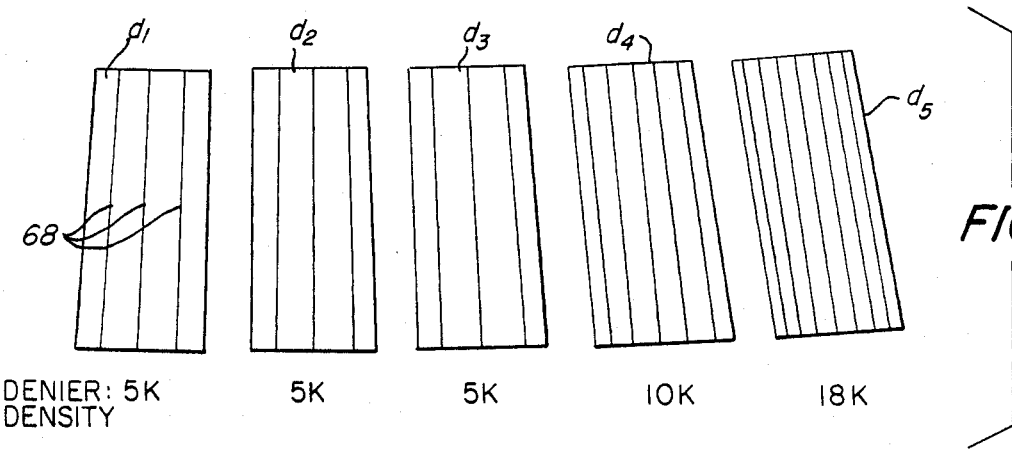
FIG. 8
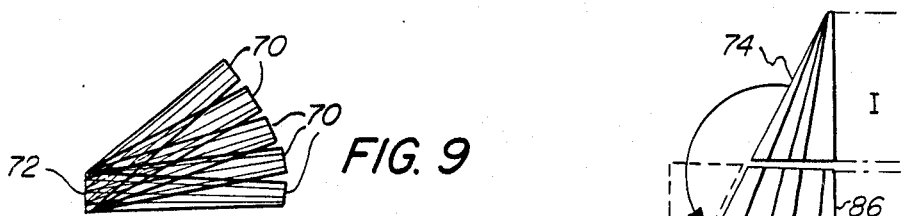
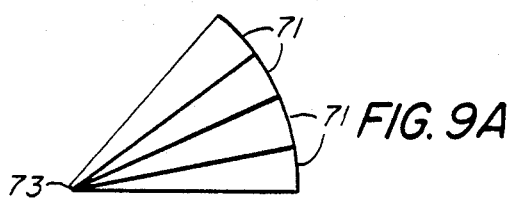
FIG. 9
FIG. 9A
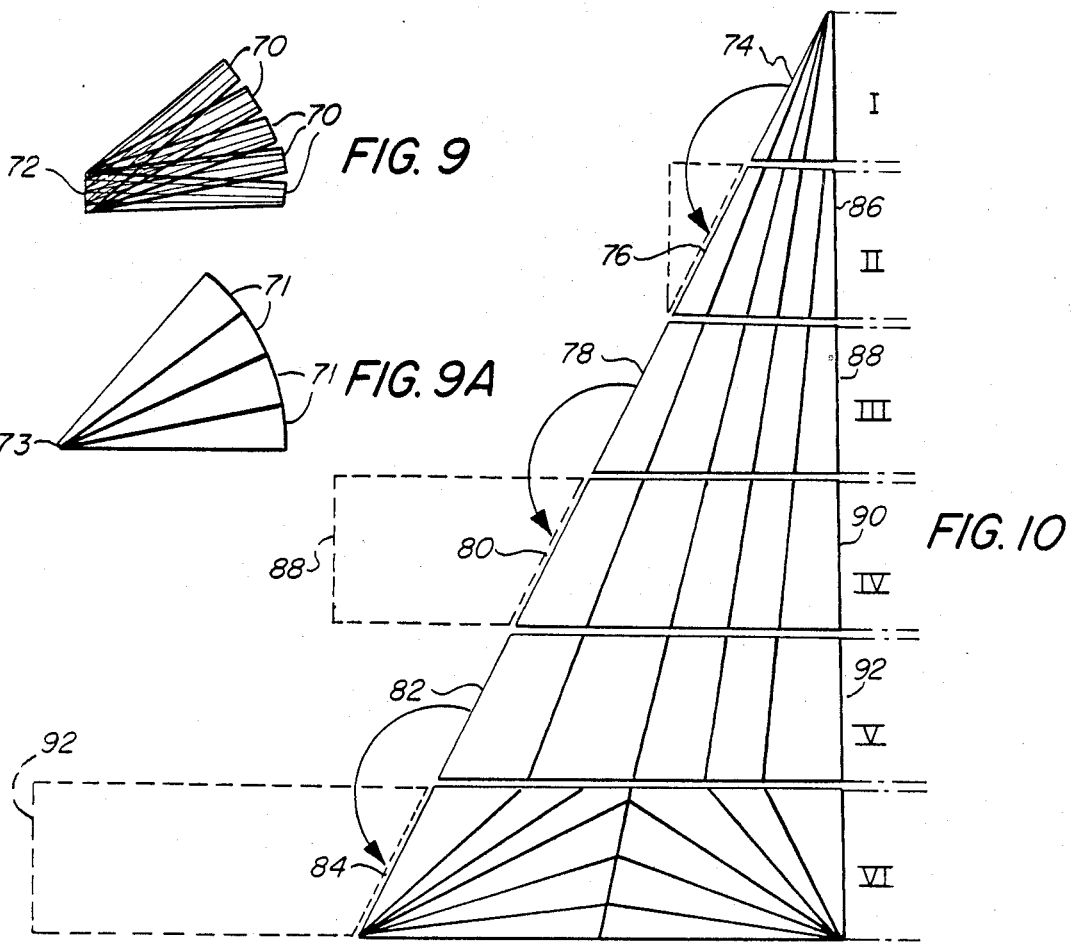
FIG. 10
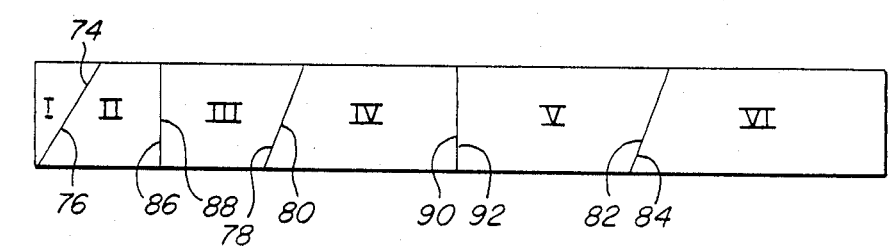
FIG. 11

REINFORCED SAILCLOTH

BACKGROUND OF THE INVENTION

1. Field of the invention

This invention relates to sails and methods for their fabrication and is more particularly concerned with improvements in reinforced sails and methods for their preparation.

2. Description of the Prior Art

Significant advances have been made in recent years in the construction of lightweight sails having high stretch resistance and strength and particularly adapted for use in racing competitions. Sailcloth representative of the present state of the art is designed to have extremely high stretch resistance and strength in one principal direction and yet possess sufficient stretch resistance and strength in other directions to permit handling of loads imposed on the sail by stresses in directions other than the aforesaid principal direction. The sailcloth of this type is assembled into a sail by uniting a series of panels of the cloth in such a way that the principal direction or axis of the cloth which possesses the high stretch resistance and strength is oriented in the direction in which the major stresses will be placed on the sail when in use.

Sailcloths having the above characteristics are prepared in general by bonding together in the form of a laminate, a stretch resistant film of synthetic polymer such as the polyester (polyethylene terephthalate) film which is available under the trademark Mylar from DuPont Company, and a substrate which takes the form of a substantially orthogonal combination of warp and fill yarns in a scrim taffeta or warp knit. One of the courses of yarns (warp or fill) in this substrate is intended to bear the major load which will be exerted on the finished laminate and therefore consists of a high stretch resistant and high tensile modulus fiber such as a high tensile modulus polyester or polyamide. A particularly desirable fiber is that fabricated from the aromatic polyamide [also known as an aramid] available from the DuPont Company under the trademark Kevlar. The other course of yarn serves to hold the fabric together (except in the case of warp-knits where the knit yarn performs this function) as well as providing tear strength, burst strength and seamability (i.e. the ability of the resulting cloth to be joined to abutting strips by means of stitched and/or adhesively bonded seams).

The layers of material in the above laminates are bonded to each other throughout their entire interfaces by means of synthetic resin adhesives such as polyurethanes, cross-linked polyester thermosets and the like.

A particular example of the above type of laminate is that described in U.S. Pat. No. 4,444,822 in which a film of stretch resistant synthetic resin film is bonded to an unwoven, warp-knit scrim. The latter comprises a system of spaced parallel strands, the strands in one layer crossing the strands in the other layer and the crossing strands in the two layers being tied together by means of a knit strand. The strands are fabricated from polymeric fibers such as polyester polyamides and the like.

However, the use of such warp-knit scrims and other related warp-knit or woven fabrics gives rise to a number of problems The over/under yarn pattern present in taffetas or scrims or the misalignment of the tie yarns in warp-knits can give rise to crimps in the load bearing yarns of the resulting laminates, thereby detracting from the desired stretch resistance and strength in the load-bearing axis of the laminate. Further, the warp-knits or woven fabrics produced from high stretch resistant fibers such as those from polyesters and polyamides, especially the preferred polyamides such as the aromatic polyamides of which that available under the trademark Kevlar is particularly preferred, are relatively expensive to produce and add significantly to the cost of the laminates into which they are incorporated.

In my earlier U.S. Pat. No. 4,679,519 issued July 14, 1987, there is described a flexible reinforced laminate which is free from the various drawbacks set forth above and has proved eminently satisfactory in the fabrication of many types of lightweight sails having high strength and stretch resistance in predetermined directions in the sail as well as imparting stretch resistance and tear strength in other directions in the sail.

Various other means of providing lightweight reinforced sails have been described recently. Illustratively, Conrad U.S. Pat. No. 4,593,639 describes a method of constructing a sail which comprises applying reinforcing members to the surface of an appropriate skin (constructed as a sail in conventional manner from a film of Mylar or like material). The reinforcing members, which can be threads of stretch resistant material such as Kevlar are aligned in the direction of the principal stresses which will be sustained by the sail when exposed to the force of the wind. Variations of this concept are described in related Conrad U.S. Pat. No. 4,624,205, which issued on a continuation-in-part of the application on which the '639 patent issued, and in related Conrad U.S. Pat. No. 4,702,190 which issued on a continuation-in-part of the application on which the '205 patent issued.

Conrad U.S. Pat. No. 4,708,080 shows a sail fabricated from a plurality of individual panels, each of which is fabricated from a laminate having at least two layers of material such as Mylar film between which are disposed non-woven, force-bearing threads of Kevlar and like stretch resistant polymeric material, which threads are aligned along the principal stress lines to which the particular panel will be subjected when installed in the sail and subjected to the force of the wind.

The present invention, which is an improvement of that of my '519 patent, is directed to a composite sail which has greatly enhanced stretch and tear resistance not only in the direction of the principal stress lines which mainly occur in the direction from the foot to the head of the sail in the leech and luff of the sail, but directions substantially parallel to the foot of the sail from the leech to the luff. The composite sails of the present invention are of particular value for use in racing yachts and provide highly efficient, light weight sails having significantly extended useful life compared with sails hitherto available.

SUMMARY OF THE INVENTION

It is an object of the invention to provide composite sails which have improved resistance to stretch and deformation not only in the directions in which the sail will be subject to maximum stress but in directions substantially parallel to the foot of the sail.

It is yet another object of the invention to provide a composite sail and a method for its fabrication having a high degree of versatility in locating reinforcing members in predetermined directions.

These objects, and other objects and advantages of the invention which will become apparent from the description which follows, are achieved by the sails of the invention and the methods by which they are fabricated. Thus, in its broadest aspect, the invention comprises a composite sail having a head, a tack and a clew, and comprised of a plurality of panels each of which is joined to an adjacent panel. Each of the panels comprises a laminate of (i) a first outer layer of material, (ii) a second outer layer which comprises at least one film layer having bonded thereto a plurality of strands of non-woven, force-bearing thread material disposed along the principal stress lines for the panel in the sail, and (iii) an inner layer disposed between said first and second outer layers and comprised of a weft-free warp of strands of a stretch resistant polymer aligned transverse to the direction of the non-woven, force-bearing thread material in the second outer layer. The various layers in the laminate are bonded together by a synthetic adhesive resin.

In a particular embodiment of the composite sails of the invention the individual panels therein are fabricated using a second outer layer which is comprised of a plurality of segments joined together along abutting edges to form the panel. Each of the segments is fabricated by cutting and like means from a reinforced sheet material comprising at least two co-extensive layers bonded together at their interfaces by a synthetic adhesive resin. One of the outer layers is a film of dimensionally stable synthetic polyester resins and the other outer layer is selected from the group consisting of a warp-knit fabric, a scrim fabric, taffeta, a film of dimensionally stable synthetic polyester resin and a layer of release paper, release film, or like material. In the event that said other outer layer is a release paper or like release material, this layer is removed prior to utilization of the joined segments as the second outer layer in the panels employed in the sails of the invention. The inner layer, or at least one of the inner layers if there are more than one, comprises a weft-free warp of strands of a stretch resistant polymer in which the strands are disposed substantially along the principal stress lines for the segment in the sail panel. The strand denier density may vary from segment to segment in an individual panel of the sail, the greater density being present in those segments in the area which will be subject to the greater stresses. Thus the segment or segments in the end of the panel which is close or closest to the leech in a mainsail will, in general, have a greater strand denier density than the segment or segments in the end of the panel closest to the luff of the sail.

By "strand denier density" is meant the total denier of strands present move direction per unit width of the sail. Illustrate a density of 18000 denier per inch width could be represented by 18 strands per inch width each of 1000 denier or 6 strands per inch width each of 3000 denier or 3 strands per inch width each of 6000 denier, or any variation of numbers of strand of the same or different denier which total 18000.

The invention also comprises the method of fabricating the various embodiments of composite sails described above.

DESCRIPTION OF THE DRAWINGS

FIG. 5 is an exploded view of another laminated sail panel in accordance with the invention.

FIG. 6 is a plan view of the laminated sail panel shown in exploded view in FIG. 5.

FIG. 7 is a partial plan view of a sheet of reinforced material from which segments of a sail panel are cut.

FIG. 7A is a cross-sectional view of a reinforced material from which sail panel segments are cut.

FIG. 8 is an assembly of segments to be formed into a sail panel.

FIGS. 9 and 9A are plan views showing details of construction of corner patches for the tack of a composite sail in accordance with the invention.

FIG. 10 illustrates the manner in which the individual panels of sail employed as starting material in accordance with the invention are assembled into a single continuous panel for processing in accordance with the invention.

FIG. 11 shows in partial plan view a continuous belt of sail panels from the sail shown in FIG. 10 after being joined end to end.

DETAILED DESCRIPTION OF THE INVENTION

The composite sails of the invention will now be described in further detail with reference to the accompanying drawings.

Figure 1:
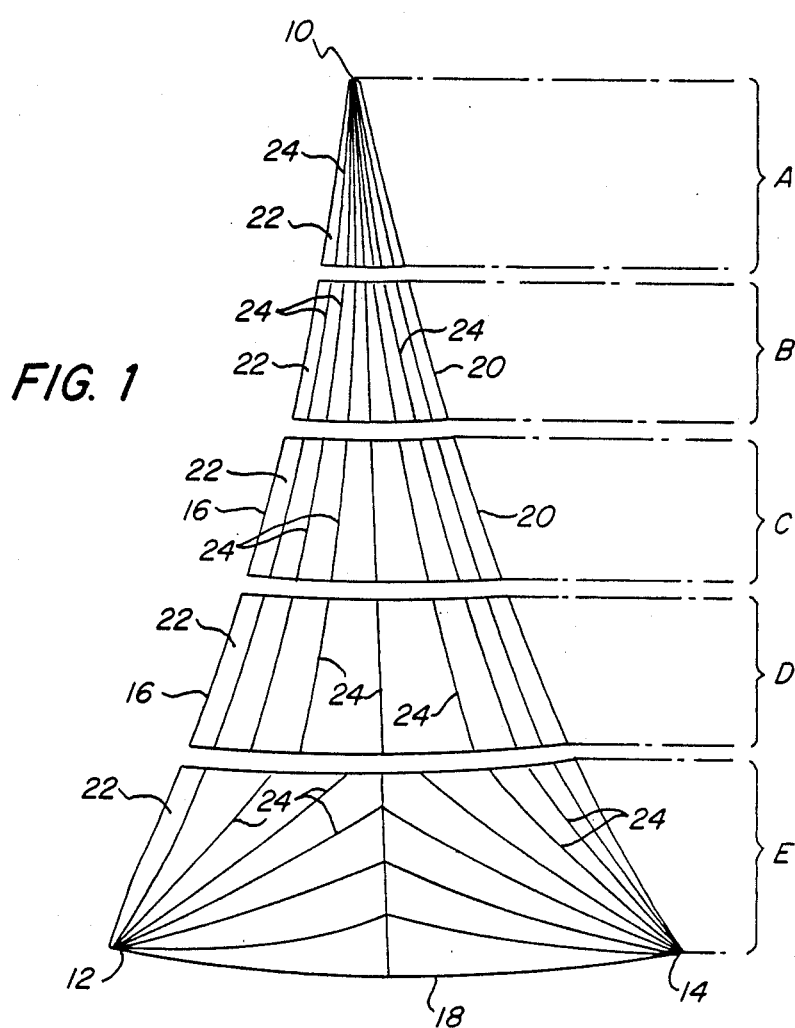
FIG. 1 is a plan view of a conventional five panel composite sail assembly employed as starting material in fabrication of a sail in accordance with the invention.

FIG. 1 shows, in plan view, five panels A-E prior to their assembly into a conventional sail by connecting them along their abutting edges in known manner such as by broad seaming. The sail when assembled from the five panels would have a head (10), a tack (12), a clew (14), a luff (16), a foot (18), and a leech (20).

In the particular embodiment shown in FIG. 1 the five panels A-E are fabricated from a skin (22) fabricated from a film having high stretch resistance. Such films are well-known in the art. Illustrative thereof are the drawn, oriented polyester films such as that available under the trademark Mylar. Other films having high tensile modulus are those fabricated from polymers such as nylon, polypropylene and the like. Advantageously the film has a thickness of the order of about 0.25 mils to about 20 mils and preferably from about 0.5 to about 3 mils. Disposed on the skin (22) in each of panels A-E are a plurality of stress-bearing structural members (24). These members are aligned in the direction of the expected principal stress lines created when the assembled sail is exposed to the force of the wind. The members (24) are formed of multiple filament strands, ribbons or strips of a stretch resistant polymer, advantageously an aramid such as Kevlar. The members (24), either in the form of free strands or ribbons or in the form of tape comprising one or a plurality of strands adhered to a backing tape such as polyethylene film, are attached to the skin (24) by adhesive after being laid on the skin by hand in a predetermined pattern. A detailed description of the preparation of such panels, of which panels A-E are illustrative, is given in the aforesaid U.S. Pat. No. 4,624,205 the specification of which is hereby incorporated in its entirety.

Figure 2:
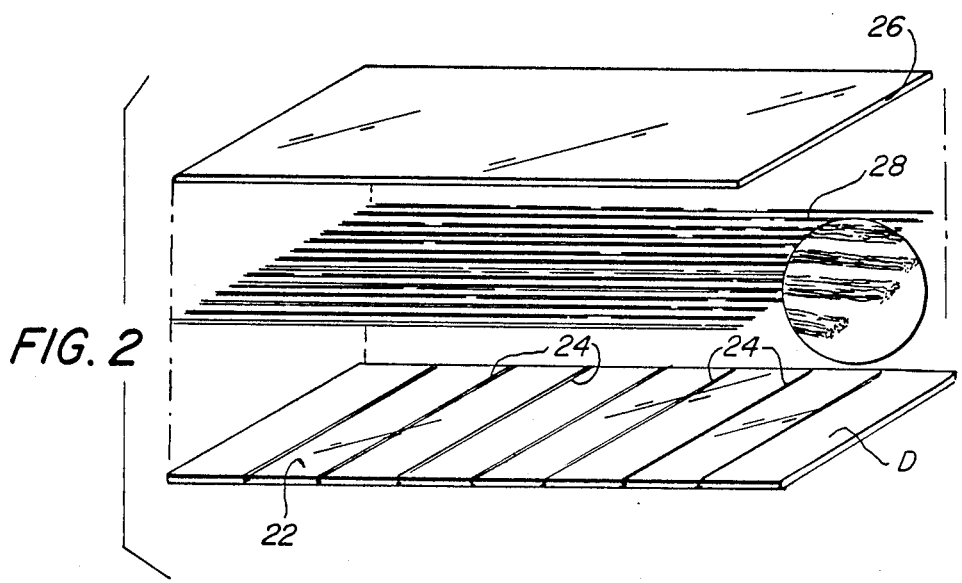
FIG. 2 is an exploded view of a laminated sail panel in accordance with the invention.

The panels A-E, advantageously after joining together to form a single continuous panel as described hereafter, are then subjected to lamination in accordance with the invention. FIG. 2 shows, in an exploded view, the three layers of a typical laminate so prepared using panel D of FIG. 1 as one of the outer layers. Layer (26) is a dimensionally stable polymeric film such as an oriented polyester film of which Mylar is typical. Layer (26) has a thickness of the order of about 0.25 mils to about 20 mils and preferably of the order of about 0.5 to about 3 mils. The thickness of layer (26) may be, but is not required to be, the same as that of the skin (22) employed in panel D. The inner layer (28) of the laminate comprises a warp of substantially parallel, spaced apart strands of a synthetic polymer, advantageously Kevlar or like aramides, oriented transverse to the structural members (24) in panel D. The three layers of the laminate are substantially co-extensive and are bonded together across their entire interfaces by a synthetic resin adhesive such as a solvent based, heat activated urethane adhesive of which that available from Morton Chemical Company under the trademark Adcote 122 is typical. The laminate is advantageously formed by coating one side of film layer (26) with adhesive solution, removing the solvent therefrom by appropriate means such as by heating to evaporate the solvent, and then applying the warp (28) to the tacky surface of layer (26), followed by panel D. Pressure is applied over the entire area of the laminate in order to ensure uniformity in bonding of the layers together. Excessive amounts of adhesive should be avoided in order to minimize contamination of equipment such as press plates, nip rolls and the like which are employed in laminating the layers together.

Figure 3:
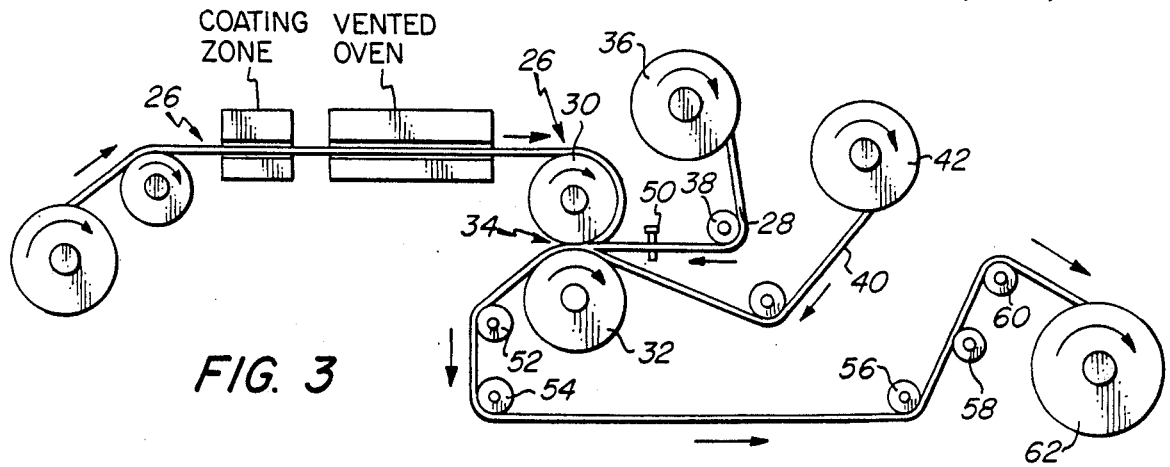
FIG. 3 is a schematic representation of an apparatus and process for manufacture of a laminate in accordance with the invention.

The fabrication of the laminate can be effected in a batch-like operation using specifically defined precut layers or can be prepared on a continuous or semi-continuous basis as shown schematically in FIG. 3. Where the operation is to be carried out on a continuous or semi-continuous basis the individual panels of sail to be laminated are joined together to form a continuous panel, which panel may also be joined to one or more similar continuous panels prepared in like manner from individual panels of identical or different sails. At the end of the lamination step the individual panels of each of the sails can then be isolated by appropriate cutting of the laminated web and thereafter are joined together along abutting edges to form a finished sail in accordance with the invention using known techniques such as broad seaming.

FIGS. 10 and 11 illustrate one method of joining the individual panels of a sail such as that shown in FIG. 1 into a single continuous panel for use in laminating in the above manner. Referring to FIG. 10, the head panel I is rotated in the direction shown by the arrow so that edge (74) of panel I abuts edge (76) of panel II. Similarly, panels III and V are rotated in the direction shown by the arrows so that edge (78) of panel III abuts edge (80) of panel IV and edge (82) of panel V abuts edge (84) of panel VI. The various abutting edges are then secured to each other temporarily by taping or like means. Thereafter edge (86) of now combined panels I and (II) is brought into abutting relationship with edge (88) of now combined panels III and IV and edge (92) of now combined panels V and VI is brought into abutting relationship with the other edge (90) of now combined panels III and IV. These various abutting edges are then secured to each other temporarily by taping or like means thus arriving at a single continuous panel as illustrated in FIG. 11. Thereafter, if desired, one or more continuous panels, formed in the same manner from identical sails or sails of a different pattern, can be joined end to end with the panel shown in FIG. 11 by taping or like means to form a continuous panel of extended length.

It is to be understood that the particular sequence in which the individual panels I–VI are assembled to form the continuous panel is not critical. The sequence described above in regard to FIGS. 10 and 11 has been given for purposes of illustration only and is not to be construed as limiting. Other methods and sequences for assembling the individual panels I–VI will be readily apparent to one skilled in the art. The continuous panels prepared as described above are then subjected to lamination illustratively using the process and apparatus shown in FIG. 3.

In accordance with the method illustrated in FIG. 3, a continuous web of film (26) is dispensed from a feed roll and passed through a coating zone in which a thin layer of adhesive is deposited on the film and evenly distributed thereon by means of a reverse roll or doctor blade to a depth of approximately 1 ml. The coated film (26) is then passed continuously through a vented oven in which the solvent is removed by evaporation. The coated film is transported from the oven, with the tacky, adhesive coated side upwards, to a heated roller (30) which, together with adjoining roller (32), forms a nip (34). The rollers (30) and (32) are adapted to move synchronously, by a motor not shown, in the direction indicated by the arrows and draw through nip (34) the coated film (26), a warp (28) of individual strands dispensed from feed roll (36) via tension bar (38) and a continuous belt (40) dispensed from feed roll (42) and comprised of a plurality of panels which have been joined end to end as described above and shown in FIGS. 10 and 11. The individual strands in warp (28) are maintained at the desired distance apart by passage through slots spaced appropriate distances apart in a reed screen (50) positioned immediately prior to the entry of the strands into the nip roll. The roller (30) is maintained at a temperature such that the adhesive coating on film (26) will still flow when subjected to the pressure exerted in passage through nip (34). Advantageously, the temperature of the roller, (30) is in the range of about 100° C. to about 200° C. depending upon the particular adhesive employed. After passage through nip (34) the newly formed laminate is wound continuously via rollers (52), (54), (56), (58), and (60) on to take-up roll (62). The laminate is ultimately cut or otherwise separated to produce the individual laminated panels corresponding to original panels I–VI shown in FIG. 10. An exploded view of a typical such panel corresponding to original panel D in FIG. 1 is shown in FIG. 2.

The various panels after lamination in the above manner, are then assembled in the shape of the desired sail and united along abutting edges using methods well-known in the art to yield the desired sail.

Figure 4:
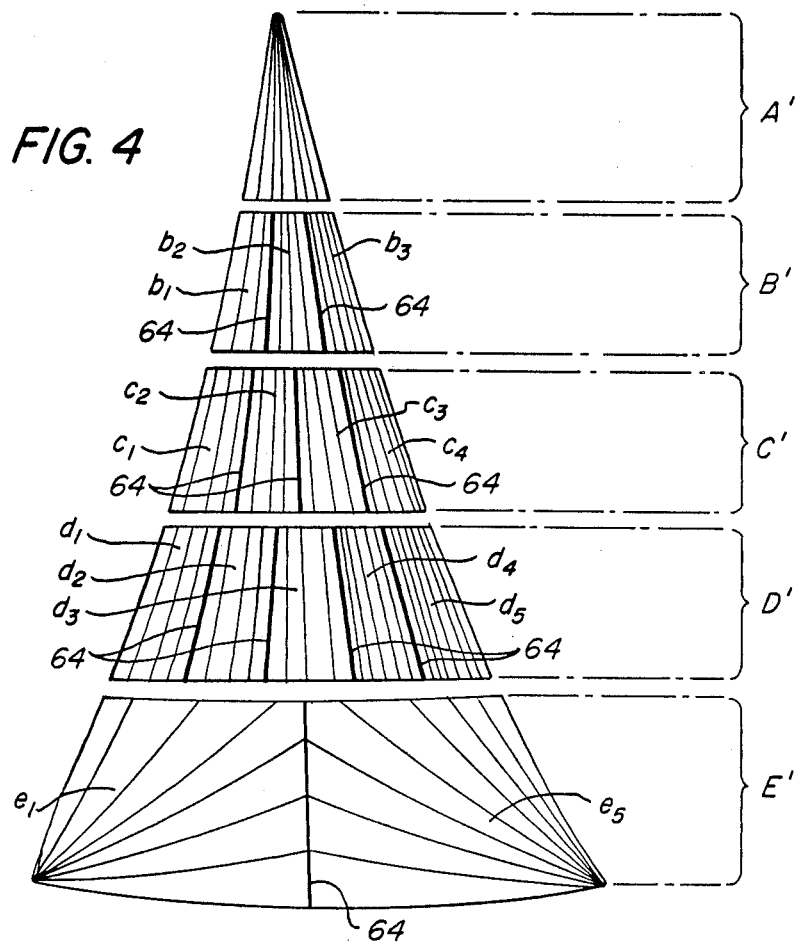
FIG. 4 is a plan view of another five panel composite sail assembly employed in the fabrication of a sail in accordance with the invention.

FIG. 4 shows another embodiment of an assembly of panels for a composite sail which are to be subjected to further reinforcement in accordance with the invention. Panels $B^1$–$E^1$ in FIG. 4 are each formed by uniting a plurality of individual segments along abutting edges; e.g. segments $b_1$, $b_2$ and $b_3$ are united to form panel $B^1$, segments $c_1$, $c_2$, $c_3$ and $c_4$ are united to form panel $C^1$ and so on. The joints (64) between individual segments, which joints are formed in any appropriate manner such as taping or gluing overlapping adjoining edges, are shown in heavy lines in FIGS. 4, 5 and 6. Each of the said segments is cut from reinforced material, as illustrated in FIG. 7. The material illustrated in FIG. 7 comprises a web (66) of film such as Mylar to which has been bonded by adhesive a warp of individual substantially parallel strands (68) of Kevlar fiber or like stretch resistant synthetic polymer. Optionally the material from which the segments are cut as shown in FIG. 7 can be provided with an additional layer (67) as shown in cross-section in FIG. 7A. The layer (67) can take the form of a release paper or like material which serves to cover any exposed areas of tacky adhesive during handling of the material and which can be removed from the individual segments after they have been cut and assembled into panels. Alternatively the layer (67) is a second film layer which can be the same as layer (66) and can be formed of a different polymer material or a fabric. The layers (66) and (67) and the warp of strands (68) sandwiched therebetween can be laminated together by known procedures such as that described above in relation to FIG. 3. In one embodiment of the invention the reinforced material from which individual segments of panels are cut is that described in my earlier U.S. Pat. No. 4,679,519, the disclosure of which is incorporated herein by reference. The material therein described is a flexible laminate comprising at least three co-extensive layers bonded together at their interfaces by a synthetic adhesive resin wherein one outer layer is a film of dimensionally stable synthetic polyester resin such as Mylar and the like, the second outer layer is selected from the group consisting of a warp-knit fabric, a scrim fabric, taffeta and a film of the same or different dimensionally stable polyester resin employed in the other outer layer and the inner layer comprises warp of individual strands of Kevlar or like stretch resistant synthetic polymer. The laminate can be prepared on a batch basis as described above in discussion of preparation of the laminate of FIG. 2 hereinabove, or can be prepared on a continuous basis using the process and apparatus illustrated in FIG. 3 herein and described in detail in the aforesaid '519 patent.

Referring again to FIG. 7, segments such as b, c, d, etc. (shown in dotted lines) are cut from the reinforcing material as shown. In one embodiment all the various segments for each of the panels $B^1$, $C^1$, $D^1$ and $E^1$ are cut from the same web. However, it is preferred that some or all of the various segments in each panel are cut from webs in which the denier density (as hereinbefore defined) of individual strands (68) differs. The denier density can be varied by varying the number and/or denier of strands (68) in the web. In general it is desirable to cut segments such as b, c, d, and e, which are located at the luff of each panel from webs in which the denier density is lower than that in the segments $b_3$, $c_4$, $d_5$, and $e_5$ located at the leech of each panel. The denier density of the intermediate segments may increase gradually from the luff to the leech. Illustratively, the denier density expressed as total denier per inch measured transverse to the individual strands can be of the order of 18000 in the segments $b_3$, $c_4$, $d_5$ and $e_5$, dropping to 10,000 in segments $b_2$, $c_3$, $d_4$ and $e_4$ and dropping further to 5000 in all other segments. Such a sequence of segments for fabrication of panel D is illustrated in FIG. 8 prior to forming the segments into a panel by uniting the abutting edges in the manner described above.

Each of the panels $Bhu 1-E^1$ is then formed in accordance with the invention into a laminate illustrated in exploded form in FIG. 5 in respect of that formed from panel $D^1$, using the batch or continuous or semi-continuous procedures described above and illustrated in FIGS. 3, 10 and 11. FIG. 6 shows in plan view the laminate (D″) so prepared. The various laminated panels are then assembled into a composite sail using conventional procedures such as those described hereinabove.

Each of the head, tack and clew of the finish composite sail may be provided with reinforcing patches which are attached by adhesive or like means. Illustrative of such patches and their method of fabrication are those for the tack shown in FIGS. 9 and 9A. The patch shown in FIG. 9 has been formed by uniting a plurality of individual strips (70) of flexible laminate such as (66), said strips (70) radiating in a fan shape from a common point (72). Similarly, the patch shown in FIG. 9A has been proposed by uniting individual panels (71) along abutting edges, said panels radiating from a common point (73).

The composite sails of the invention can also be provided with edge reinforcements, batten pockets, cringles, leech lines, foot lines, and the like, commonly provided on such sails. The sails prepared in accordance with the invention may include mainsails, gaff sails, jibs, spinnakers, and the like, and are not to be construed as limited to the particular embodiments set forth herein which are given for purposes of illustration only.

The sails of the invention are possessed of marked advantages compared with similar sails previously known in the art. Thus, said sails having markedly improved tensile strength, tear strength, and stretch resistance and are capable of withstanding loads in all directions when the sails are exposed to the forces of the wind. Further this added strength and stretch resistance is achieved without significant sacrifice in lightness of weight of the sail. The method by which the individual panels of the sails are fabricated requires significantly less labor and time than is the case with conventional methods of sail fabrication. Further, the embodiments such as those described in FIGS. 4, 7 and 10 and 11 have a marked economic advantage in that any wastage of material occurs at the early stage shown in FIG. 7 when the material being wasted is relatively cheap as compared with the final panels from which the ultimate sail is prepared. The latter panels suffer little or no wastage in the cutting from the continuous panels produced in lamination on the continuous basis as discussed hereinabove. Other advantages of the method of the invention and the sails produced thereby will be readily apparent to one skilled in the art.

Although specific embodiments of the invention have been discussed above in some detail, it is to be understood that these are offered for purposes of illustration only and are not to be construed as limiting. The actual scope of the invention is defined by the claims which are set forth below.

What is claimed is:

1. A composite sail having a head, a tack and a clew, said sail being comprised of a plurality of panels, each of said panels being joined to an adjacent panel and each of said panels comprising a laminate of (i) a first outer layer of material, (ii) a second outer layer which comprises at least one film layer having bonded thereto a plurality of strands of non-woven, force-bearing thread material disposed along the principal stress lines for said panel in said sail, and (iii) an inner layer disposed between said first and second outer layers and comprised of a weft-free warp of strands of a stretch resistant polymer aligned transverse to the direction of the nonwoven, force-bearing thread material in said second outer layer, all of said layers being bonded together by a synthetic adhesive resin.

2. A composite sail according to claim 1 wherein said second outer layer is composed of a plurality of individual segments which are joined together along abutting edges.

3. A composite sail according to claim 2 wherein at least one of the segments in each panel is formed from a material having a greater strand denier density than that of the others.

4. A composite sail according to claim 3 wherein the segment in each of said panels adjacent the leech of said sail has a greater strand denier density than the segment in the same panel adjacent the luff of said sail.

5. A composite sail according to claim 1 wherein said weft-free warp of strands is fabricated from an aramid.

6. A composite sail according to claim 1 wherein said force-bearing thread material is fabricated from an aramid.

7. A composite sail according to claim 1, wherein said first outer layer is fabricated from a film of dimensionally stable synthetic polyester resin, and wherein the second outer layer is comprised of two layers of material between which is sandwiched said plurality of strands of non-woven, force-bearing thread material, one of said layers being a film of dimensionally stable synthetic polyester film and the other of said layers being selected from the group consisting of a warp-knit fabric, a scrim fabric, taffeta and a film of dimensionally stable synthetic polyester resin.

8. A composite sail according to claim 1 wherein said panels include selvage material along the abutting edges thereof.

9. A composite sail according to claim 1 wherein said plurality of panels include broad seams between each adjacent panel.

10. A composite sail according to claim 1 wherein high stress bearing panels are provided for the head, the tack and the clew.

11. A composite sail having a head, a tack and a clew, said sail being comprised of a plurality of panels each of which is joined to an adjacent panel, each of said panels being comprised of a laminate of (i) a first outer layer of material;

(ii) a second outer layer which is comprised of a plurality of individual segments joined together along abutting edges each of said segments being formed of reinforced material comprising at least three co-extensive layers bonded together at their interfaces by a synthetic adhesive resin wherein each outer layer thereof is a film of dimensionally stable synthetic polyester resin, and wherein there is at least one inner layer comprising a weft-free warp of strands of a stretch resistant polymer said strands in each segment being disposed substantially along the principal stress lines for said segment in said sail; and (iii) an inner layer comprised of a weftfree warp of strands of a stretch resistant polymer aligned in the direction of the longitudinal dimension of said panel;

said layers (i), (ii) and (iii) being bonded together at their interfaces by a synthetic adhesive resin.

12. A composite sail according to claim 11 wherein the denier density of strands of stretch resistant polymer in layer (ii) varies between the segments in each panel, the high density being located in the segments nearest the leech of said sail and the lower density being located in the segments nearest the luff of said sail.

13. A composite sail according to claim 11 wherein said weft-free warp of strands employed in layers (ii) and (iii) is fabricated from an aramid.

14. A composite sail according to claim 11 wherein said first outer layer (i) is a film of dimensionally stable synthetic polyester resin.

15. A composite sail according to claim 11 wherein said panels included selvage material along the abutting edges thereof.

16. A composite sail according to claim 11 wherein said plurality of panels includes broadseams between each adjacent panel.

17. A composite sail according to claim 11 wherein high stress bearing panels are provided for the head, the tack and the clew.

18. A composite sail according to claim 11 wherein the sail is a jib sail.

19. A composite sail according to claim 11 wherein the sail is a mainsail.

20. A composite sail according to claim 11 wherein the sail is a spinnaker sail.

* * * * *

Disclaimer 4,945,848—*James C. Linville*, Beach Dr., Rowayton, Conn. REINFORCED SAILCLOTH. Patent dated Aug. 7, 1990. Disclaimer filed May 6, 1991, by the assignee, Dimension Polyant Sailcloth, Inc.

Hereby enters this disclaimer to claims 1, and 5-10 of said patent.

[ *Official Gazette August 6, 1991* ]